United States Patent [19]

Sekoguchi et al.

[11] Patent Number: 4,750,524

[45] Date of Patent: Jun. 14, 1988

[54] APPARATUS FOR INTERCHANGING ORIFICE PLATES FOR ORIFICE FLOWMETER

[75] Inventors: Kotohiko Sekoguchi, Toyonaka; Yoshiteru Sonoda, Osaka, both of Japan

[73] Assignee: Fujikin International, Inc., Osaka, Japan

[21] Appl. No.: 39,334

[22] Filed: Apr. 17, 1987

[30] Foreign Application Priority Data

Apr. 18, 1986 [JP] Japan .................................. 61-90628

[51] Int. Cl.⁴ .............................................. F15D 1/02
[52] U.S. Cl. ..................................................... 138/45
[58] Field of Search ........... 73/861.53, 861.61, 861.62; 138/41, 44, 45, 46, 94.3; 251/120, 121, 229, 326

[56] References Cited

U.S. PATENT DOCUMENTS 2,031,151  2/1936  Eulberg ............................ 138/45 X
2,820,482  1/1958  Greenwood ....................... 138/94.3

Primary Examiner—Mark J. Thronson
Attorney, Agent, or Firm—Armstrong, Nikaido, Marmelstein & Kubovcik

[57] ABSTRACT

A closed orifice plate stowage disposed outside an orifice plate mount portion at an intermediate portion of a pipe channel has a communication opening on one side of the mount portion for passing an orifice plate therethrough and is in communication with the mount portion through the opening. A movable body housed in the plate stowage and movable in a direction parallel with the pipe channel has a plurality of orifice bins arranged in parallel with the pipe channel at a spacing. A device is provided for moving orifice plates one by one between the mount portion and the plate bins of the movable body through the opening.

7 Claims, 9 Drawing Sheets

APPARATUS FOR INTERCHANGING ORIFICE PLATES FOR ORIFICE FLOWMETER

BACKGROUND OF THE INVENTION

The present invention relates to an apparatus for interchanging orifice plates for an orifice flowmeter. The term "orifice plate" refers to a plate having a flow restricting aperture, i.e., an orifice.

Typically, orifice flowmeters comprise an orifice plate disposed at an intermediate portion of a pipe channel. Standards are set for such orifice plates as to the shape and dimensions of the orifice, and standardized orifice plates are usable for measuring flow rates without the necessity of calibration. However, a single orifice plate is designed for measuring a specified range of flow rates, such that a change of flow rate range requires use of a different orifice plate. While orifice plates are changed usually by disassembling the fluid pipe, the procedure is cumbersome and takes much time. While experiments are sometimes conducted at frequently altered flow rates in laboratories or the like, changing orifice plates requires a long period of time and is very inefficient. Further when a toxic fluid is passed through the pipe channel, orifice plate changing involves a hazard, must be done with care and therefore requires a very long period of time.

SUMMARY OF THE INVENTION

The main object of the present invention is to provide an apparatus for interchanging orifice plates with ease and safety without disassembling the fluid pipe of the orifice flowmeter.

More specifically, the present invention provides an apparatus for interchanging orifice plates for an orifice flowmeter, characterized in that the apparatus comprises a closed orifice plate stowage disposed outside an orifice plate mount portion at an intermediate portion of a pipe channel and having a communication opening on one side of the mount portion for passing the orifice plate therethrough, the plate stowage being in communication with the mount portion through the opening, a movable body housed in the plate stowage and movable in a direction parallel with the pipe channel, the movable body having a plurality of orifice plate bins arranged in parallel with the pipe channel at a spacing, and a device for moving the orifice plates one by one between the mount portion and the plate bins of the movable body through the communication opening.

With use of the apparatus of the present invention, orifice plates can be changed with ease and safety without disassembling the fluid pipe of the orifice flowmeter. Accordingly, when orifice plates are frequently changed in laboratories or the like or even if a toxic fluid is passed through the pipe channel, the orifice plates can be changed within a greatly shortened period of time, hence a high efficiency. Further since the apparatus is adapted to interchange a plurality of orifice plates, standardized orifice plates are usable which need no calibration. The apparatus is therefore highly useful.

DESCRIPTION OF THE PREFERRED EMBODIMENT

The present invention will be described below in greater detail with reference to the accompanying drawings.

Figure 1:
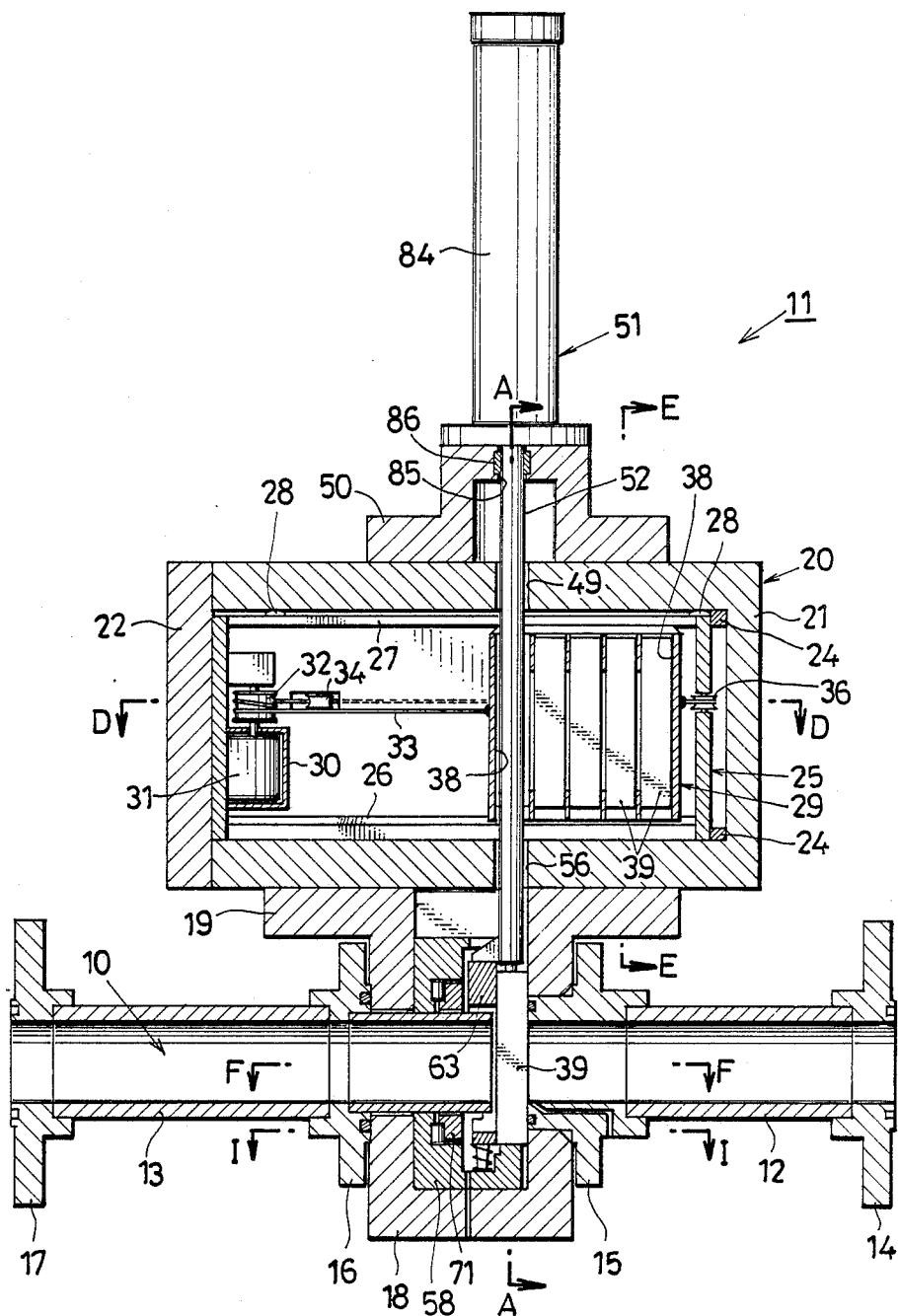
FIG. 1 is a view in vertical section showing the pipe channel of an orifice flowmeter and an orifice plate interchanging apparatus of the invention provided therefor.
Figure 2:
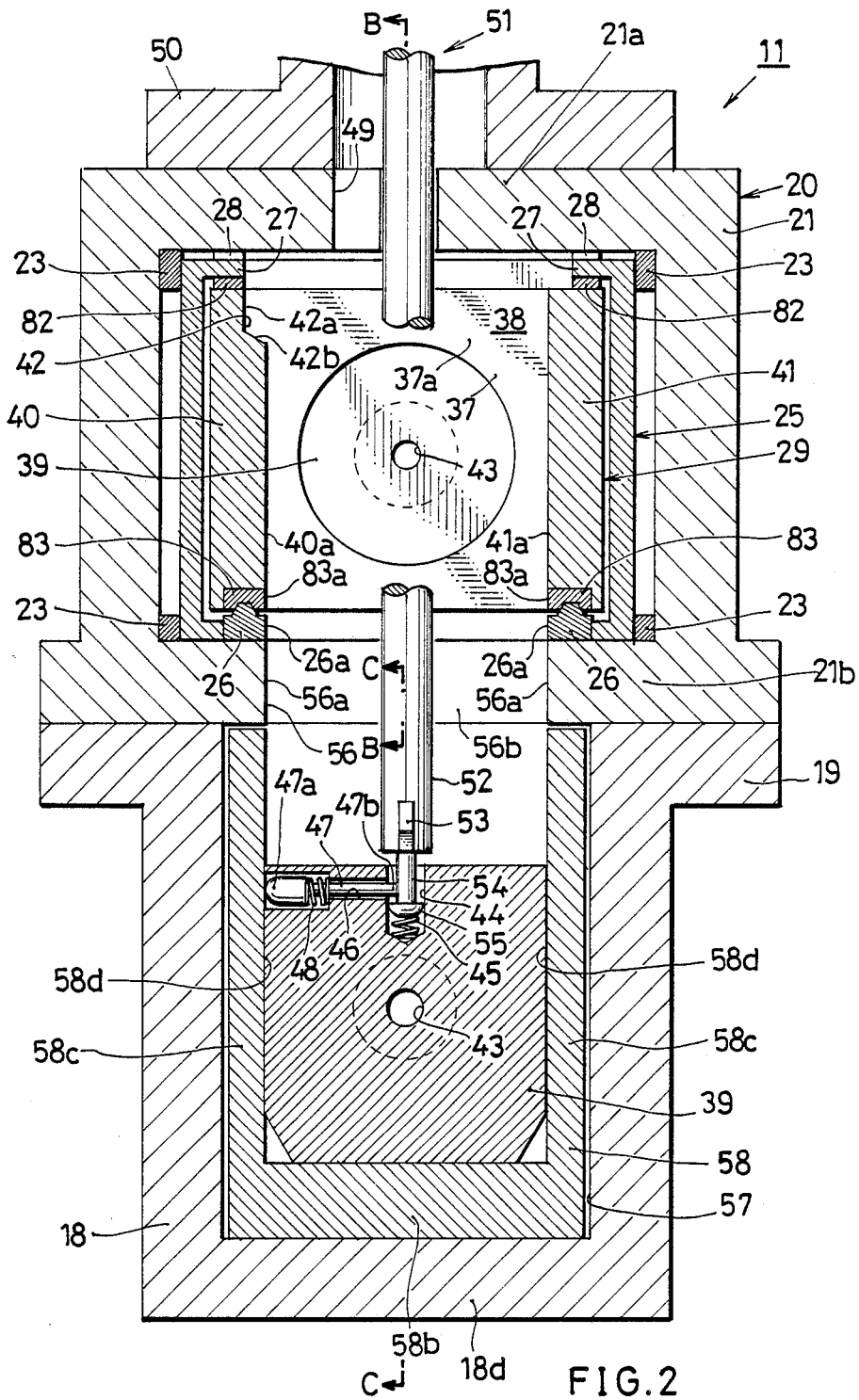
FIG. 2 is an enlarged view in section taken along the line A—A in FIG. 1.
Figure 3:
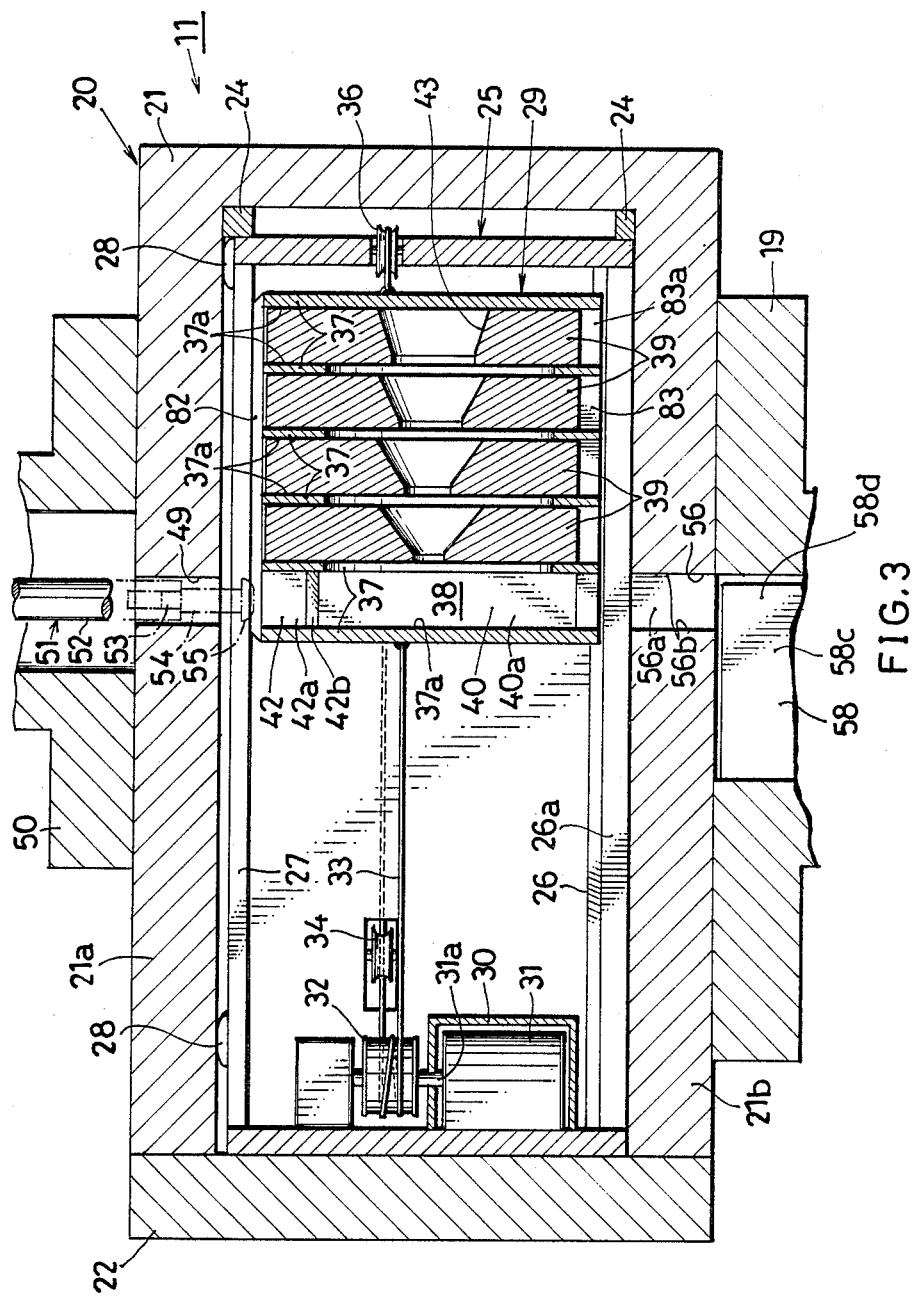
FIG. 3 is a view in section taken along the line B—B in FIG. 2.
Figure 4:
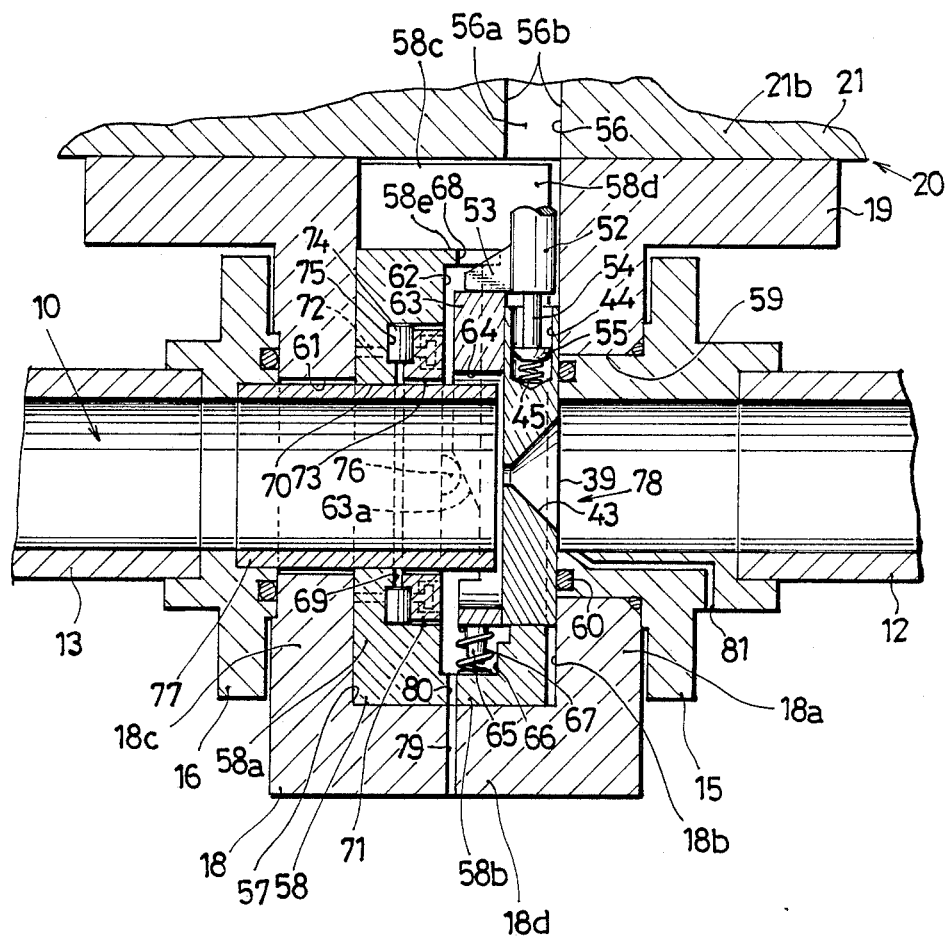
FIG. 4 is a view in section taken along the line C—C in FIG. 2.
Figure 5:
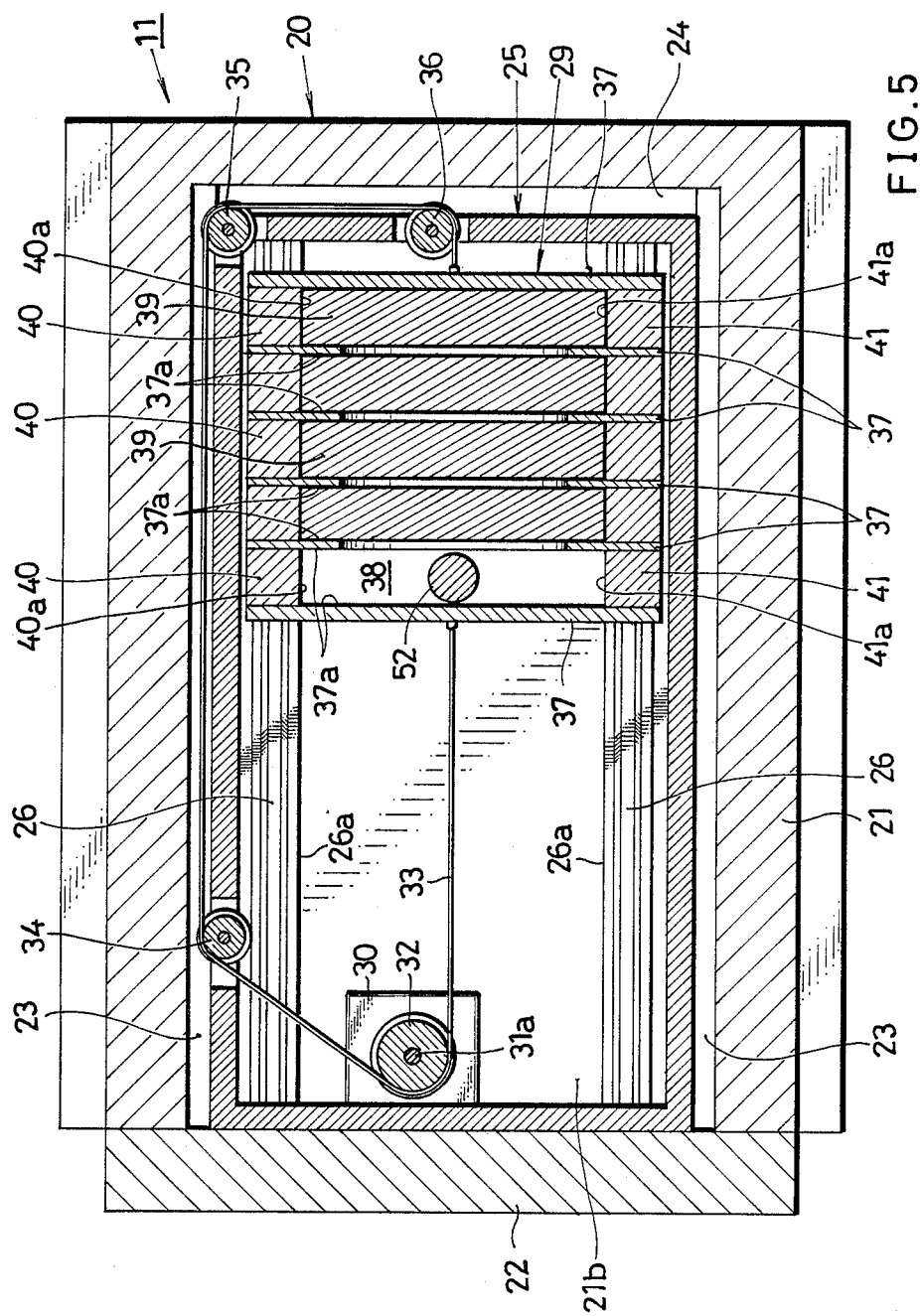
FIG. 5 is an enlarged view in section taken along the line D—D in FIG. 1.
Figure 6:
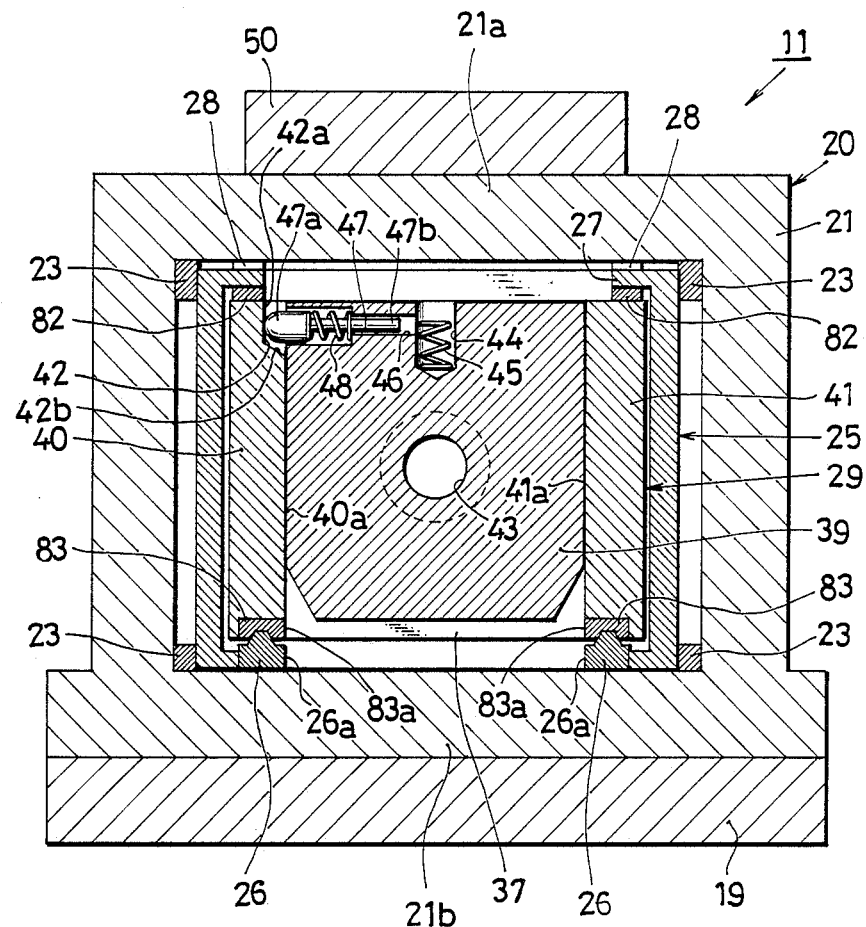
FIG. 6 is an enlarged view in section taken along the line E—E in FIG. 1.
Figure 7:
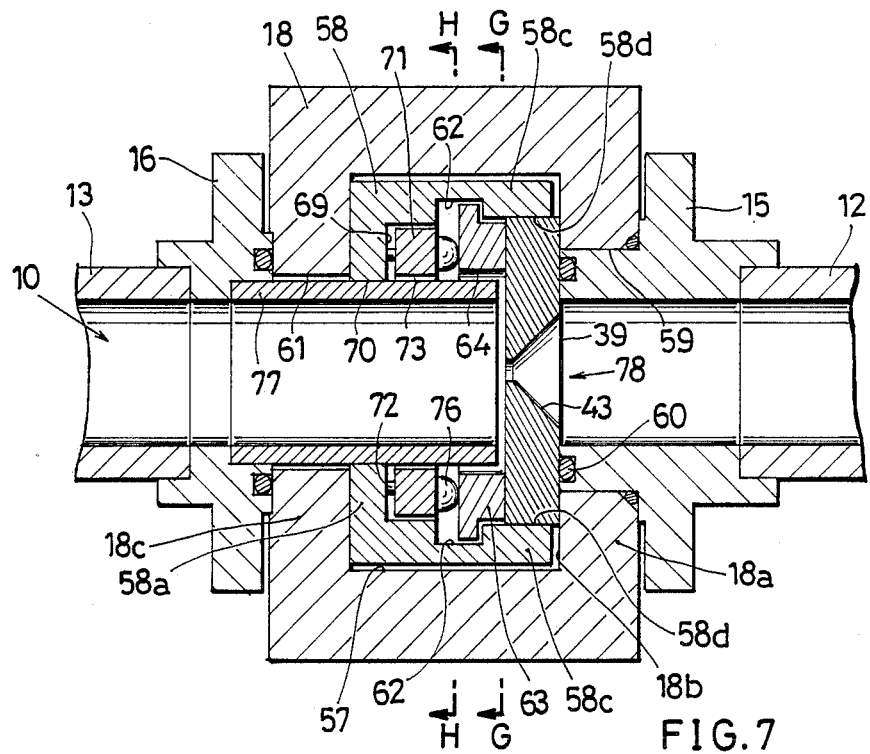
FIG. 7 is an enlarged view in section taken along the line F—F in FIG. 1.
Figure 10:
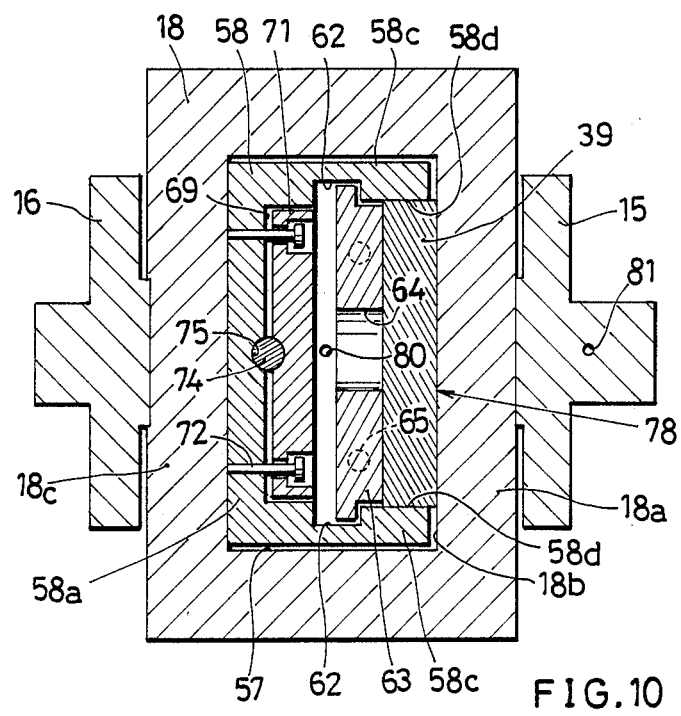
FIG. 10 is an enlarged view in section taken along the line I—I in FIG. 1.
Figure 8:
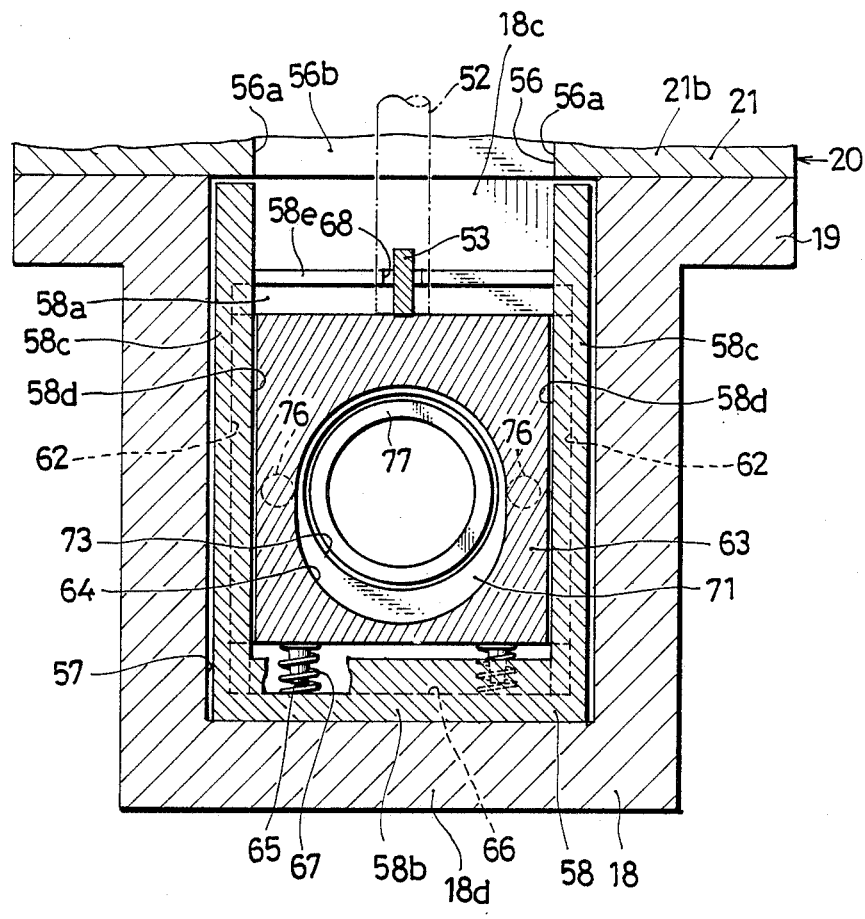
FIG. 8 is a view in section taken along the line G—G in FIG. 7.
Figure 9:
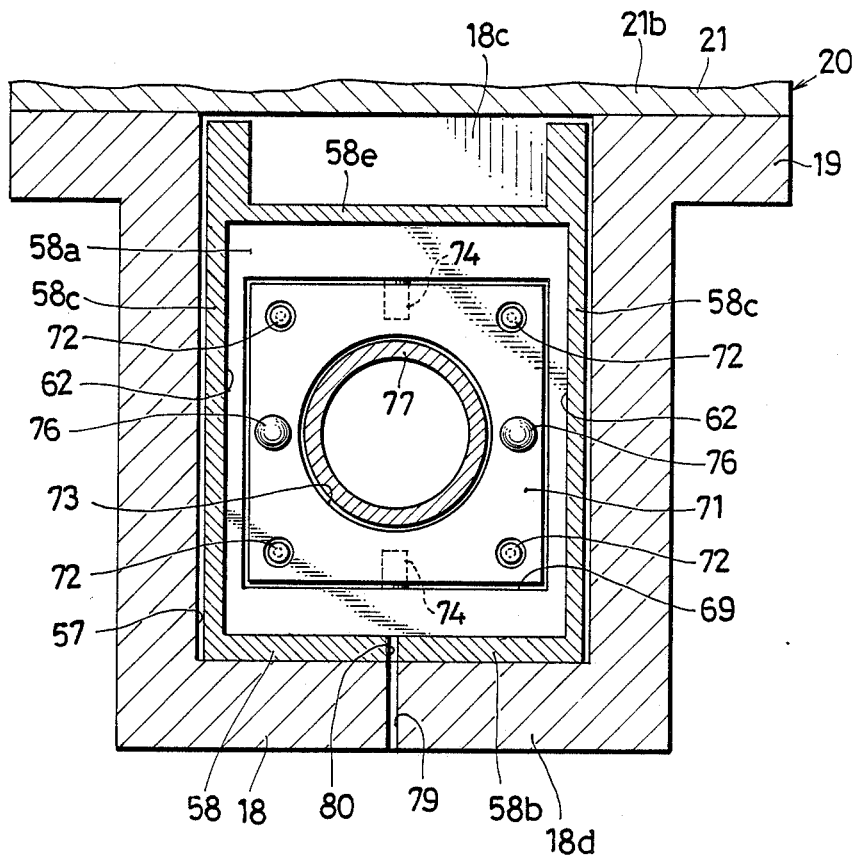
FIG. 9 is a view in section taken along the line H—H in FIG. 7.

FIG. 1 shows a horizontal pipe channel 10 of an orifice flowmeter and an orifice plate interchanging apparatus 11 mounted on the channel. The channel 10 is provided by pipes 12, 13 and pipe flanges 14, 15, 16 and 17. A fluid is passed from the left side rightward in the drawing. The terms "front", "rear", "right" and "left" are hereinafter used with respect to the direction of flow of the fluid. More specifically stated with reference to FIG. 1, the right side of the drawing is front, the left side is rear, the rear side of the plane of the drawing is left and the front side thereof is right.

At an intermediate portion of the channel 10, a rectangular parallelepipedal first block 18 for installing an orifice plate 39 therein is held between the two flanges 15, 16. A closed orifice plate stowage 20 positioned in parallel with the channel 10 is fixedly mounted on a flange 19 at the upper end of the block 18.

With reference to FIGS. 1 to 3, 5 and 6, the plate stowage 20 comprises a rectangular parallelepipedal main body 21 having an open rear end and a closure 22 for closing the open end. The main body 21 is internally provided at its four corners with upper and lower opposed four guides 23 extending along the channel 10 and has upper and lower two stoppers 24 at the front end of the body 21 inside thereof. A box-shaped rectangular parallelepipedal frame 25, which is open at its upper and lower sides, is secured to the front (inner) side of the closure 22. A lower guide rail 26 extending longitudinally of the channel 10 is secured to each of the right and left sides of the frame 25 at its bottom. An upper guide rail 27 projecting horizontally inward is integral with each of right and left sides of the frame 25 at its top. The upper guide rail 27 is fixedly provided with a plurality of shoes 28 on its upper side. While the stowage main body 21 has an upper wall 21a and a bottom wall 21b, the frame 25 is inserted into the main body 21 along the upper wall lower surface, the bottom wall upper surface and the guides 23 and is positioned in place by these walls, the guides and the stoppers 24. With the frame 25 thus positioned in place, the closure 22 is fixed to the stowage main body 21 to close the body.

A movable rack (body) 29 in the form of a rectangular parallelepipedal frame is provided between the guide rails 26, 27 of the frame 25 and is slidable toward the front and rear. The movable rack 29 has a pair of upper opposite shoes 82 and a pair of lower opposite shoes 83 extending longitudinally of the channel 10. A motor 31 for driving the movable rack 29 is fixedly provided within a closed case 30 in front of the closure 22 and has a shaft 31a fixedly carrying a pulley 32. A rope 33 reeved around the pulley 32 has one end attached to the rear end of the movable rack 29, is passed around a pulley 34 disposed at a rear portion of the frame 25 on the left side thereof and around two pulleys 35, 36 arranged at the front end of the frame 25 and is connected at other end to the front end of the rack 29. The movable rack 29 has a plurality of (e.g. five) orifice plate bins 38 separated by partition members 37 and arranged longitudinally of the rack (the channel) at a given spacing. Orifice plates 39 are stowed in the bins 38 respectively. Guide members 40, 41 are fixedly provided at the left and right sides of each bin 38, respectively. The opposed guide faces 40a and 41a of the left and right guide members 40, 41 are on the same vertical plane as the opposed guide faces 83a of the lower shoes 83 and the opposed guide faces 26a of the lower guide rails 26 at the left and right sides of the stowage 20, respectively. At each of these sides, the guide faces provide a vertically continuous face. The left guide member 40 is formed at its upper end an outwardly recessed portion 42 for locking the orifice plate. The bottom face 42a of the recessed portion 42 is continuous with a slanting face 42b, which in turn is continuous with the guide face 40a.

The orifice plate 39 is generally rectangular parallelepipedal and has an orifice 43 in its center. The front-to-rear thickness of the orifice plate 39 is slightly smaller than the spacing between the partition members 38. The right-to-left width of the plate is slightly smaller than the distance between the guide members 40, 41. The height of the plate is smaller than the height of the bin 38. An engaging cavity 44 is formed in the center of the upper end face of the orifice plate 39, with a coiled spring 45 attached to the bottom of the cavity 44. The orifice plate 39 is formed, in an upper portion of its left end face, with a stepped bore 46 extending into the cavity 44. A stepped pin 47 slightly longer than the bore 46 is inserted in the bore from the left side. A coiled spring 48 for biasing the pin 47 leftward is provided between the stepped portion of the bore 46 and the stepped portion of the pin 47. When the orifice plate 39 is stowed in the bin 38, the left outer end 47a of the pin 47, projecting leftward, is fitted in the recessed portion 42 of the left guide member 40, whereby the orifice plate 39 is locked (see FIG. 6). At this time, the right inner end 47b of the pin 47 is in a retracted position within the bore 46.

The upper wall 21a of the stowage main body 21 has a guide bore 49 extending vertically therethrough approximately in its center. A cup-shaped closure 50 is fixed to the upper side of the upper wall 21a for closing the bore 49. A device 51 for moving the orifice plate is provide at this portion. The device 51 comprises a lift rod (handling rod) 52 extending downward through the guide bore 49 and an air cylinder 84 for lifting and lowering the rod 52. The air cylinder 84 is fixed to the top of the closure 50 as oriented vertically downward and has an unillustrated piston connected to the lift rod 52. The rod 52 extends downward through a hole 85 in the top wall of the closure 50, with a packing 86 fitted in the hole 85 around the rod 52. A trapezoidal pushing plate 53 is secured to the lower end of the lift rod 52 on an outer side portion thereof. A pin 54 smaller than the rod 52 in diameter integrally extends from the center of the lower end face of the rod 52. An engaging flange 55 is integral with the lower end of the pin 54. The flange 55 has an outside diameter smaller than the diameter of the upper end cavity 44 of the orifice plate 39. Although not shown, the plate moving device 51 has suitable means for rotating the rod 52 through 90 degrees about its axis at a specified position as will be described later.

The bottom wall 21b of the stowage main body 21 is formed with a rectangular communication opening 56 for the orifice plate 39 to pass therethrough. The opening 56 is defined by right and left opposed guide faces 56a and front and rear opposed guide faces 56b. At each of the right and left sides of the opening 56, the guide face 56a is flush and continuous with the guide face 26a of the lower guide rail 26 on the bottom wall 21b. When each pair of adjacent partition members 37 is positioned above the opening 56 as specified, the guide face 56b is flush with the guide face 37a of the partition member 37 at each of front and rear sides of the opening 56.

The motor 31 moves the movable rack 29 forward or rearward by one bin pitch or several bin pitches so as to position the desired bin 38 between the opening 56 and the lift rod 52 in its raised position. The adjustment of such movement of the movable rack 29 and the replacement of orifice plates 39 can be made easily with the closure 22 removed from the stowage main body 21.

With reference to FIGS. 1, 2, 4 and 7 to 10, the first block 18 has a cavity 57 extending to its bottom and having a rectangular horizontal section. A second block 58 for installing the orifice plate therein is fitted in the cavity 57. The first block 18 has a front wall 18a defining the cavity 57 and formed with a circular hole 59 concentric with the flange 15 fixed to the wall. The flange 15 has a rear portion fitted in the circular hole 59 and a rear end face flush with the rear surface (guide face) 18b of the front wall 18a. An O-ring 60 is attached to the flange end face. The first block 18 has a rear wall 18c defining the cavity 57 and formed with a circular hole 61 concentric with the flange 16 fixed to the rear wall 18c. The communication opening 56 of the main body 21 is opposed to the front portion of the cavity 57 of the first block 18. The front wall rear face 18b of the first block 18 is flush with the front face 56b defining the opening 56.

The second block 58 is so shaped as if it is prepared from a rectangular parallelepiped by cutting away its upper and front portions, leaving a rear wall 58a, a bottom wall 58b and opposite right and left side walls 58c. The front portion of the bottom wall 58b is fixed to the bottom wall 18d of the first block 18 with bolts or the like. The front portions of the opposed surfaces of the side walls 58c of the second block 58 serve as guide faces 58d. At each of the right and left sides of the opening 56, the guide face 58d is flush and continuous with the opening-defining guide face 56a positioned immediately thereabove. A vertical guide groove 62 is formed in the rear portion of the inner surface of each side wall 58c. An orifice plate holder 63 in the form of a rectangular plate is fitted in the opposed grooves 63 at its lateral side rear portions and is slightly movable vertically and longitudinally of the channel 11.

Although the front portion of the holder 63 is positioned between the guide faces 58d in front of the grooves 62, the holder 63 is slightly movable transversely of the channel 11. The holder 63 has a hole 64 in the form of a vertically elongated circle and is formed on the rear side of its lower portion a downwardly fowardly slanting face 63a. At each of opposite lateral sides of the holder 63, a rodlike projection 65 extends from its bottom face and is loosely fitted in a dent 66 formed in the upper surface of the bottom wall 58b of the second block 58. A coiled spring 67 is provided around the projection 65 in pressing contact with the bottom face of the holder 63 and the bottom of the dent 66 for biasing the holder 63 upward. A horizontal forward extension 58e integral with the front portion upper end of the rear wall 58a of the second block 58 extends over the entire length of this end for restraining the holder 63 from moving upward. The extension 58e has at its midportion a cutout 68 for permitting the pushing plate 53 on the lift rod 52 to pass therethrough.

A square shallow recess 69 is formed in the front surface of the rear wall 58a of the second block 58. The bottom of the recessed portion 69 has a circular hole 70 approximately equal in diameter to the hole 61 in the rear wall 18c of the first block 18. A square pressing member 71 is loosely fitted in the recess 69 and loosely attached to the recessed bottom at its four corners with bolts 72. A circular hole 73 slightly larger than the hole 70 of the second block 58 is formed in the pressing member 71. Upper and lower short vertical solid cylinders 74 are secured to the rear side of the member 71, each with its rear half projecting from the rear surface. These cylinders 74 are fitted in upper and lower semicylindrical dents 75 formed in the bottom of the recessed portion 69, rendering the pressing member 71 slightly rotatable about the cylinders 74. A semispherical projection 76 is provided on the front side of the pressing member 71 at each of its opposite lateral sides and is in contact with the slanting face 63a of the holder 63.

A short pipe 77 is secured to the front side of the flange 16 on the rear wall 18c of the first block 18 concentrically with the flange 16. The short pipe 77 extends through the holes 61, 70, 73 of the first block 18, the second block 58 and the pressing member 71 into the hole 64 of the holder 63. The distance between the front end of the short pipe 77 and the rear surface 18b of the front wall of the first block 18 is slightly larger than the front-to-rear thickness of the orifice plate 39.

The first block front wall 18a defining the cavity 57, the holder 63 and the bottom wall 58b and the lateral side walls 58c of the second block 58 define a space serving as an orifice plate mount portion 78. When the holder 63 moves downward, the projections 76 on the pressing member 71 push and wedge the slanting face 63a, thereby moving the holder 63 forward, whereby the distance between the first block front wall 18a and the holder 63 is made slightly smaller than the front-to-rear thickness of the orifice plate 39. The distance becomes slightly larger than the orifice plate thickness when the holder 63 moves upward.

Pressure take-off ports 79 and 80 in register with each other extend through the bottom walls 18d, 58b of the first block 18 and the second block 58, respectively. A pressure take-off port 81 is also formed in the flange 15 on the first block front wall 18a.

The drawings show an orifice plate 39 as installed in the mount portion 78. In this state, the lift rod 52, extending through an empty bin 38 of the movable rack 29 and the communication opening 56 of the stowage main body 21 into the upper portion of the cavity 57 of the first block 18, has its flange 55 positioned at the bottom portion of the cavity 44 in the orifice plate 39 within the mount portion 78 to press the coiled spring 45 downward, whereby the orifice plate 39 is pressed against the bottom wall 58b of the second block 58. The left outer end 47a of the pin 47 in the orifice plate 39 is in contact with the left guide face 58d of the second block, and the right inner pin end 47b is in an advanced position above the flange 55 in the cavity 44. The pushing plate 53 on the lift rod 52, passing through the cutout 68 in the second block 58, is oriented rearward and positioned below the extension 58e, pressing the holder 63 downward. Consequently, the holder 63, pressed forward by the projections 76 on the pressing member 71, holds the orifice plate in pressing contact with the rear end face of the flange 15. The pressing member 71, which is slightly rotatable about the cylinders 74, is capable of pressing the entire holder 63 uniformly against the orifice plate 39.

For orifice plate changing, the lift rod 52 is slowly raised first, whereby the holder 63 is slightly raised by being biased by the springs 67 and is therefore released from the pressing force. When the lift rod 52 rises a predetermined amount, the flange 55 comes into engagement with the right inner end 47b of the pin 47, raising the orifice plate 39. When the pushing plate 53 of the lift rod has moved to a position above the extension 58e after passing through the cutout 68, the aforementioned rotating means rotates the rod 52 through 90 degrees to direct the pushing plate 53 rightward within cavity 57. Further rise of the lift rod 52 moves the orifice plate 39 from the mount portion 78 into the empty bin 38 of the movable rack 29 through the opening 56 of the stowage main body 21. While the orifice plate 39 is being thus raised, the left outer end 47a of the pin 47 comes into contact with the left guide face 58d of the second block 58, the opening-defining left guide face 56a, the guide faces 26a, 83a of the left lower guide rail 26 and the left lower shoe 83 and the left guide face 40a of the bin 38 one after another, thereby always holding the right inner pin end 47b in its advanced position within the cavity 44 in engagement with the flange 55 without allowing the orifice plate 39 to fall off under gravity. Upon the orifice plate 39 being completely placed into the bin 38, the pin 47 fits into the recessed portion 42 from the guide face 40a by being biased by the spring 48, thereby locking the orifice plate 39 in the bin 38. At the same time, the right inner end 47b of the pin 47 retracts into the bore 46, releasing the lift rod 52 and permitting the rod 52 alone to rise upward off the orifice plate 39. After the lift rod 52 has been brought to and stopped at a position above the movable rack 29 as indicated in a broken line in FIG. 3, the movable rack 29 moves to position to orifice plate 39 to be subsequently used immediately below the lift rod 52. The rod 52 then slowly lowers. With the descent of the rod 52, the flange 55 enters the cavity 44 in the orifice plate 39 and depresses the coiled spring 45, thereby slowly lowering the orifice plate 39. The pin 47 slides along from the bottom face 42a of the recessed portion 42 onto the slanting face 42b, moving rightward to come into contact with the guide face 40a off the recessed portion 42. This brings the right inner end 47b of the pin 47 into the orifice plate cavity 44 to its advanced position above the flange 55, consequently obviating the likelihood of the plate 39 falling under gravity. Further descent of the lift rod 52 moves the orifice plate 39 out of the bin 38 into the mount portion 78 through the communication opening 56 of the stowage main body 21. The pushing plate 53 of the lift rod 52 moves down to an upper portion within the cavity 57 of the first block 18, whereupon the rotating means rotates the rod 52 through 90 degrees to direct the pushing plate 53 rearward. The rod 52 thereafter further descends, bringing the pushing plate 53 to below the extension 18e through the cutout 68, thereby causing the flange 55 on the rod 52 to depress the spring 45 in the bottom of the plate cavity 44 and forcing the pushing plate 53 to depress the holder 63. Consequently, the orifice plate 39 is pressed against the bottom wall 58b of the second block 39 and against the rear end face of the flange 15 in the same manner as already described and is thereby properly installed in the mount portion 78.

The foregoing orifice plate changing operation can be carried out full-automatically using a computer or the like, selecting an orifice plate 39 of optimal orifice size. Alternatively, orifice plates 39 can be interchanged semi-automatically through a manual procedure every time there arises a need to change plates.

Desired means is usable for lifting and lowering the lift rod 52, as well as for rotating the rod 52. The lift rod 52 is rotatable in operative relation with the lifting-lowering movement, for example, using cams or the like. Further the lift rod 52 is made manually movable from outside the stowage 20. The construction of the device 51 for moving the orifice plate is not limited to that of the foregoing embodiment but can be modified suitably. The movable rack (body) 29 and the moving means therefor can also be modified suitably. The rack 29 can be made manually movable from outside the stowage 20. Furthermore, the orifice plate 39, plate mount portion 78 and means for locking the orifice plate 39 in the mount portion 78 are not limited to those of the foregoing embodiment but can be altered or modified suitably. The orifice plate interchanging apparatus described above is merely an illustrative embodiment of the invention and is in no way limitative.

What is claimed is:

1. An apparatus for interchanging orifice plates for an orifice flowmeter, the apparatus comprising an intermediate portion of a pipe channel, an orifice plate mount portion positioned in said intermediate portion, a closed orifice plate stowage disposed outside the orifice plate mount portion and having a communication opening on one side of the mount portion for passing one of the orifice plates therethrough, the plate stowage being in communication with the mount portion through the opening, a movable body housed in the plate stowage and movable in a direction parallel with the pipe channel, the movable body having a plurality of orifice plate bins arranged in parallel with the pipe channel at a spacing, and a device for moving the orifice plates one by one between the mount portion and the plate bins of the movable body through the communication opening.

2. An apparatus as defined in claim 1 wherein the orifice plate stowage comprises a main body having an open end and a closure for closing the open end of the main body, the closure having a frame secured to its inner side, the frame being movably provided with the movable body and having means for moving the movable body.

3. An apparatus as defined in claim 1 wherein the orifice plate moving device comprises a handling rod having a forward end movable between a position at one side of the movable body opposite to the side of the movable body adjacent to the communication opening of the plate stowage and a position inside the mount portion through plate bin and the communication opening.

4. An apparatus as defined in claim 3 wherein each of the plate bins of the movable body and the communication opening have guide faces for guiding widthwise lateral opposite sides and the thickness-wise opposite sides of one of the orifice plates, the mount portion having guide faces for guiding the widthwise sides and a guide surface for guiding one of the thickness-wise sides, the mount portion being provided with an orifice plate holder movable toward the guide surface of the mount portion to fixedly press the orifice plate against the guide surface when the forward end of the handling rod enters the mount portion.

5. An apparatus as defined in claim 4 wherein the plate holder may be forced downwardly by the handling rod, and wherein the mount portion has projections extending in a direction parallel to the pipe channel an the plate holder has a slanting face movable into contact with said projections when the plate holder is forced downwardly by the handling rod so as to wedge the plate holder toward the guide surface of the mount portion.

6. An apparatus as defined in claim 5 further comprising a pressing member slightly rotatably disposed in the mount portion facing said plate holder, said projections being provided on said pressing member.

7. An apparatus for interchanging orifice plates for an orifice flowmeter, the apparatus comprising, the orifice plates, an intermediate portion of a pipe channel, an orifice plate mount portion positioned in said intermediate portion, a closed orifice plate stowage disposed outside the orifice plate mount portion and having a communication opening on one side of the mount portion for passing one of the orifice plates therethrough, the plate stowage being in communication with the mount portion through the opening, a movable body housed in the plate stowage and movable in a direction parallel with the pipe channel, the movable body having a plurality of orifice plate bins arranged in parallel with the pipe channel at a spacing, and a device for moving the orifice plates one by one between the mount portion and the plate bins of the movable body through the communication opening;

and wherein the orifice plate moving device comprises a handling rod having a forward end movable between a position at one side of the movable body opposite to the side of the movable body adjacent to the communication opening of the plate stowage and a position inside the mount portion through a plate bin and the communication opening;

and wherein each of the plate bins of the movable body and the communication opening have guide faces for guiding widthwise lateral opposite sides and thickness-wise opposite sides of one of the orifice plates, the mount portion having guide faces for guiding the widthwise sides and a guide surface for guiding one of the thickness-wise sides, the mount portion being provided with an orifice plate holder movable toward the guide surface of the mount portion to fixedly press the orifice plate against the guide surface when the forward end of the handling rod enters the mount portion;

and wherein the plate holder may be forced downwardly by the handling rod, and wherein the mount portion has projections extending in a direction parallel to the pipe channel and the plate holder has a slanting face movable into contact with said projections when the plate holder is forced downwardly by the handling rod so as to wedge the plate holder toward the guide surface of the mount portion;

and the apparatus further comprising a pressing member slightly rotatably disposed in the mount portion facing said plate holder, said projections being provided on said pressing member;

and wherein the forward end of the handling rod has a pin of small diameter and an engaging flange provided at the forward end of the pin, and one of the orifice plates has an engaging cavity formed in one end face thereof for the pin of the handling rod to move thereinto, a stepped bore formed in one of the widthwise lateral sides of the said one plate and communicating with the engaging cavity and a stepped pin longer than the stepped bore, movably inserted in the stepped bore and biased outward widthwise of the said one plate, one of the lateral side guiding faces of the plate bin having a recessed portion indented outward widthwise thereof and positioned in corresponding relation to the stepped pin for locking the said one orifice plate, the recessed portion being continuous with said one guiding face via a slanting face, the stepped pin being outwardly movable by the spring to fit the outer pin end into the locking recessed portion and retract the inner pin end from the engaging cavity of the plate into the stepped bore when the said one orifice plate is stowed in the bin, the stepped pin being inwardly movable by being pushed by the guiding face when the said one orifice plate is otherwise positioned to thereby project the inner pin end into the engaging cavity into engagement with the engaging flange of the pin of the handling rod.

* * * * *